(12) United States Patent
Norton

(10) Patent No.: US 6,292,727 B1
(45) Date of Patent: Sep. 18, 2001

(54) VEHICLE OCCUPANT PRESENCE AND POSITION SENSING SYSTEM

(76) Inventor: Peter Norton, P.O. Box 62, Northville, MI (US) 48167

(*) Notice: Subject to any disclaimer, the term of this patent is extended or adjusted under 35 U.S.C. 154(b) by 0 days.

(21) Appl. No.: 09/218,231

(22) Filed: Dec. 22, 1998

Related U.S. Application Data

(63) Continuation-in-part of application No. 08/660,834, filed on Jun. 10, 1996, which is a continuation of application No. 08/359,947, filed on Dec. 20, 1994, now abandoned, which is a continuation of application No. 08/157,380, filed on Nov. 23, 1993, now abandoned.

(51) Int. Cl.$^7$ .................................................. G06F 7/00
(52) U.S. Cl. ..................... 701/45; 340/438; 280/735; 180/271
(58) Field of Search ................... 701/36, 45, 46, 701/47; 340/436, 438, 667, 669; 307/9.1, 10.1; 280/235, 727, 734, 735; 180/271, 274, 282

(56) References Cited

U.S. PATENT DOCUMENTS 5,074,583 * 12/1991 Fujita et al. ...................... 280/735
5,525,843 * 6/1996 Höwing ............................ 307/9.1

* cited by examiner

Primary Examiner—William A. Cuchlinski, Jr.
Assistant Examiner—Edward Pipala

(57) ABSTRACT

A vehicle seat occupant presence and position sensing system for vehicles equipped with air bags comprises means for measuring the magnitude and Q of capacitance between electrodes in the seat. The magnitude and Q are combined by a microprocessor to characterize the seat occupant and, if the occupant is a person, ascertain the distance of the back of the person from the back of the seat thereby distinguishing between a seat occupied by a normally seated person and certain other circumstances in which deployment of air bags is not desired. A microprocessor prevents air bag deployment when the seat has not held a normally seated person immediately prior to an accident. The position of the occupant relative to the seat, the track position and recline angle of the vehicle seat and vehicle deceleration during a crash are used to estimate the position of the occupant relative to a deploying air bag during the crash. Knowing the position of the occupant enables a highly accurate determination of the best usage to make of an air bag.

22 Claims, 2 Drawing Sheets

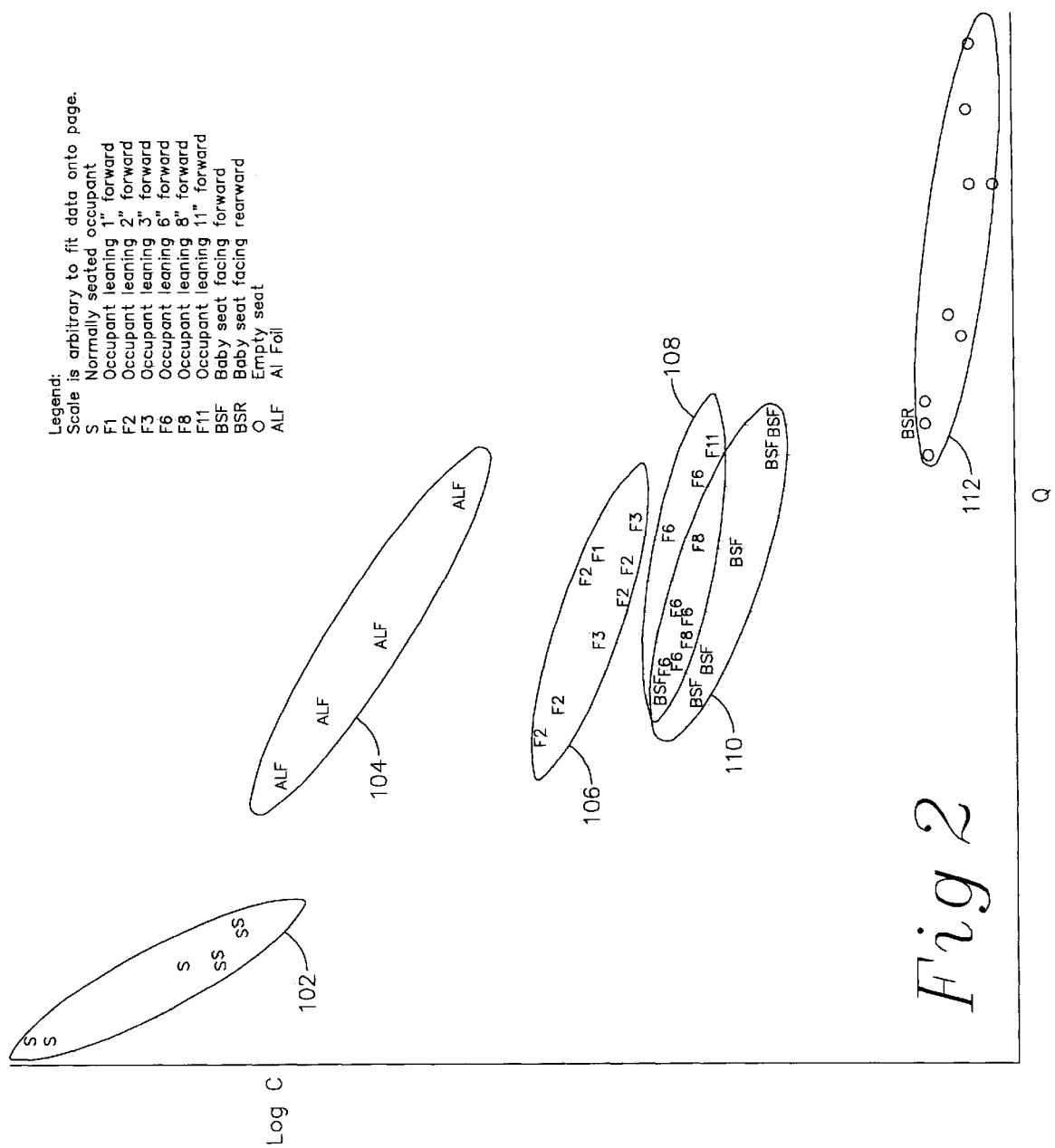

VEHICLE OCCUPANT PRESENCE AND POSITION SENSING SYSTEM

This is a continuation-in-part of application Ser. No. 08/660,834 filed Jun. 10, 1996 for *"Occupant Position Sensing System"* which is a continuation of application Ser. No. 08/359,947 filed Dec. 20, 1994 now abandoned, for *"Occupant Position Sensing System"* which is a continuation of application Ser. No. 08/157,380 filed Nov. 23, 1993 now abandoned for *"Occupant Sensing System"*.

FIELD OF THE INVENTION

This invention relates systems for determining if a vehicle seat is occupied by a person and, if so, insuring that the air bag will protect the person during a collision as well as possible.

BACKGROUND OF THE INVENTION

An air bag comprises an inflatable bag and means for inflating the bag. Air bags are highly desired life saving devices that have performed well in many accidents and saved many lives. However, the bag must be inflated in a very brief time such as ⅓₀ of a second which requires rapid movement of the bag from a stored and compacted state to a fully inflated state. The rapid deployment of the bag involves great force. A deploying bag can injure a person during the early phases of deployment if the person is very close to where the airbag is stored. Another hazardous circumstances is when the occupant is a baby in a rear-facing baby seat. It is also desired to inhibit deployment if there is no person in the seat. Much effort has gone into developing systems for characterizing the occupant and ascertaining the occupant position to meet this need. Proposed systems attempt to ascertain the distance from the inflator to the occupant and systems using sonic and optical ranging for that purpose are well known. These systems are deficient in that they cannot reliably distinguish between an occupant and other things such as road maps, beverage cups, packages and voluminous clothing which cause indications that the occupant is near the inflator. Known prior art systems operate to measure the distance from the inflator to the occupant, presumably because that is the physical variable most easily related to the potential for injury.

Many vehicles include an accelerometer located in the passenger compartment for sensing the deceleration of a crash. These accelerometers are incorporated in sensing and diagnostic modules or "SDM" which are decision making centers for the vehicle occupant protection system. The output of the accelerometer may be integrated by an analog circuit or a microprocessor in the SDM to compute a difference between the velocity the vehicle was traveling before a crash and the velocity of the passenger compartment during the crash. The integral of the accelerometer output may be integrated again to obtain the second integral of the deceleration which is the displacement of a free body from its initial position relative to the vehicle. An occupant not wearing a seat belt is, to a good approximation, a free body. Therefore, this calculation provides the distance an unbelted occupant has moved from his or her initial position at any time during the crash. Vehicles typically include seat belt latched sensors for indicating seat belt usage.

Position and angle sensors are in commercial production for sensing the position of a seat on its track and the angle the seat is reclined.

Capacitive proximity sensors have been well known for many years and have many successful applications. In addition to measuring capacitance, the Q of the capacitance may be used to provide additional information about the nature of the material being detected. Some materials including materials containing water tend to reduce the Q of the sensed capacitance.

Circuits for measuring capacitance and the Q of a capacitor are well known and are incorporated in many commercially available measuring instruments.

A general object of this invention is to provide an occupant position sensing means and associated decision making for automotive vehicles which also overcomes certain disadvantages of the prior art.

SUMMARY OF THE INVENTION

The present invention provides capacitor electrodes and means responsive to the capacitance between them to indicate the presence and position of a vehicle occupant that is highly reliable and economical to manufacture.

Further, in accordance with this invention, one capacitor electrode is placed in the back of a vehicle seat and a second capacitor electrode is placed in the seat cushion of a vehicle seat.

Further, in accordance with this invention, it is shown that identifying when air bags may or may not be safely and effectively deployed is in most circumstances equivalent to determining whether or not the seat is occupied by a person in a normal seated position.

Further, in accordance with this invention, it is ascertained that a seat is occupied by a person and a measurement is obtained of the distance from the back of the seat to the back of the person.

Further, in accordance with this invention, the position of a person is determined from the distance from the back of the seat to the back of the person. This is preferable to ascertaining the position of a person by measuring the position of the front of the person because it is unusual for there to be objects likely to affect capacitance between the back of the seat and the back of the person whereas a person is likely to place objects in front of himself or herself which confuse known measuring systems which are based on reflected sound or light.

Further, in accordance with this invention, a highly accurate seat occupant presence and position sensing system is provided because at most times when a vehicle is in motion people in seats are either seated normally or positioned where air bag deployment could be dangerous. Further, by identifying if a seat is occupied by a normally seated person or is vacant other important conditions such as forward or rearward facing child seats are also identified.

Further, in accordance with this invention, occupants that have moved into dangerous positions are detected. An occupant reaching forward to place or retrieve something on the dash may be dangerously close to the inflator for a short time. By determining that the back of the occupant is ten inches or more from the back of the seat this invention allows the air bag to be disabled to eliminate the risk of injury. Note that such events are so infrequent and of such short duration that disabling deployment of the air bag during such events leaves the occupant protected almost all of the time. The capacitive presence and position sensing system of the invention provides information about the distance the occupant is leaning forward that can be used to further refine the decision making prior to disabling or enabling deployment of the air bag.

Further, in accordance with this invention, occupants that remain in dangerous positions are detected. For example, a person might lean forward constantly. One reason a person might lean forward constantly is if the person is very short and needs to lean forward to see the road. Another possible reason is the need to see view the road near the front of the vehicle during snow or fog. A person stretching forward and upward to get a better view is particularly vulnerable to injury by a rearward deploying air bag. The capacitive presence and position sensing system of the invention provides information about the distance the occupant is leaning forward for use to prevent air bag deployment when the seat occupant is far from a normal position. Since no known system accurately determines the occupant presence and position and is not confused by extraneous objects a capacitive occupant presence and position sensing system is an improvement on the known art.

Further, in accordance with this invention, the capacitive presence and position sensing system may also measure the Q of the capacitances being sensed to thereby ascertain additional information about the occupant of the seat.

Further, in accordance with this invention, the capacitive presence and position sensing system may also provide information about the distance of the occupant from the normal position against the back of the seat to further enhance the determination of whether or not deployment is warranted.

The invention is responsive to the distance of the back of a seated occupant from the surface of the seat back. This may, for example, be used to prevent deployment of an airbag when the occupant is located too far forward of the seat back.

Further, in accordance with this invention, certain seat occupation categories are each represented by distinct ovals in the Q-log C plane thereby providing a simple method for interpreting a measurement of capacitance and Q.

Further, in accordance with this invention, seat track and recline sensors and the acceleration measured by the accelerometer in the SDM are combined to determine the occupant position as a vehicular crash progresses. To this end the sensor of the occupant presence and position sensor of the invention continuously informs a microprocessor of the occupant's position relative to the seat. The microprocessor combines the occupant position with the seat track and recline measurements to continuously maintain the position of the occupant relative to the vehicle. During a crash the movement of an unbelted seat occupant is determined by calculating the second integral of vehicle deceleration measured by the accelerometer in the SDM and the occupant position is estimated to be the original position adjusted forward by the amount of the second integral. If the occupant is belted the head and upper torso will move forward according to the second integral but the lower parts will not.

A complete understanding of this invention may be obtained from the description that follows taken with the accompanying drawings.

DESCRIPTION OF THE DRAWINGS

FIG. 2 shows the results of measuring the capacitance between the electrodes illustrated in FIG. 1 for different occupant positions and other circumstances.

BEST MODE FOR CARRYING OUT THE INVENTION

Figure 1:
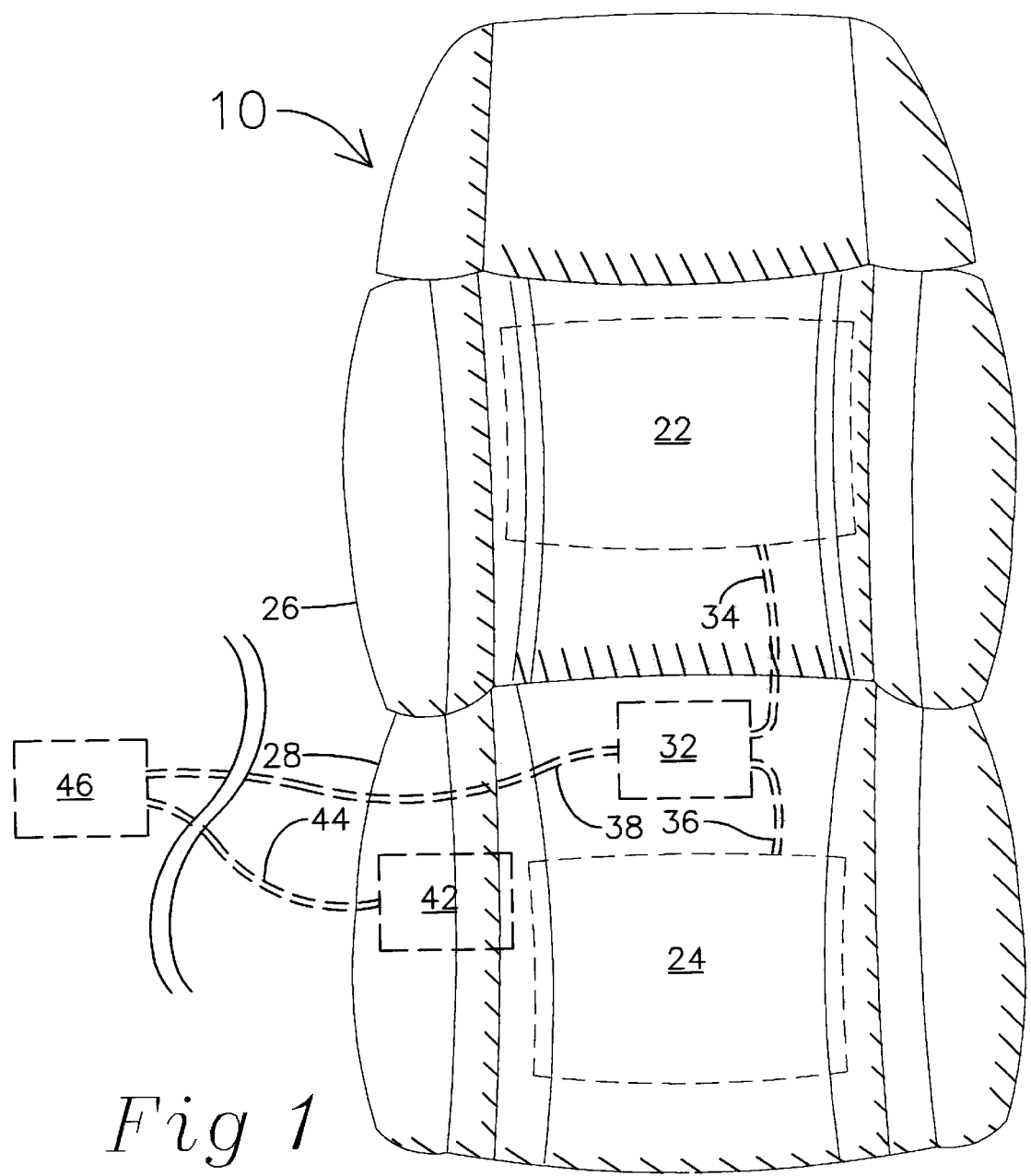
FIG. 1 shows an automobile seat and illustrates electrodes between which capacitance may be measured.

Referring now to FIG. 1, the occupant presence and position sensing system 10 comprises two electrodes 22 and 24 beneath the fabric of an automobile seat back 26 and seat cushion 28 respectively. A capacitance and Q measuring circuit 32 is connected with electrode 22 by electrical conductor 34 and with electrode 24 by electrical conductor 36. It is also connected with the decision making center 46 of the vehicle occupant protection system by electrical conductor 38. During operation of the vehicle, circuit 32 repeatedly measures the capacitance and Q between electrode 22 and electrode 24 and sends an electrical signal through conductor 38 to inform the decision making center 46 of the results of the measurements. The occupant presence and position sensing system of the invention may also include seat position sensor 42 which sends an electrical signal through conductor 44 to keep the decision making center 46 of the occupant protection system informed about the position of the seat. It will be appreciated as the description proceeds that the invention may be implemented in different embodiments.

Referring particularly to FIG. 1, the electrodes 22 and 24 may be any electrically conducting material that is sufficiently flexible that it will be imperceptible to the seat occupant when placed beneath the fabric of the seat. A preferred electrically conducting material for electrodes 22 and 24 is a fabric woven partially or entirely of copper or aluminum wires that are sufficiently fine to provide the required flexibility for seat comfort. Another preferred material is a woven textile fabric on which aluminum or another metal has been vapor deposited. Capacitance and Q measuring circuit 32 may be any of the many known circuits for measuring capacitance and Q and which provides sufficient accuracy for measuring capacitances in the range of the capacitance between electrodes 22 and 24. In one experimental occupant presence and position sensing system 10 the capacitance ranged between five picofarads and five thousand picofarads. A similar range is likely in other occupant presence and position sensing systems. Capacitance and Q measuring circuit 32 may also include a microprocessor or other circuitry for analyzing the capacitance and Q that are measured and providing an interpretation of the measurements through conductor 38 to the decision making center 46 of the vehicle occupant protection system.

Seat position sensor 42 if it is included may be any sensor suitable for determining the position of the seat relative to the structure of the vehicle and transmitting that information to the decision making center 46 of the vehicle occupant protection system. A preferred sensor for seat position sensor 42 would be a combination of a current production seat track position sensor and a current production seat recline sensor selected for compatibility with the specific seat. The decision making center 46 of the vehicle occupant protection system is preferably an SDM containing an accelerometer for sensing vehicle deceleration during a crash and a microprocessor containing code for integrating the accelerometer output to obtain the change in vehicle speed during a crash. There may also be code in the microprocessor for integrating the change in vehicle speed to determine the second integral of deceleration during a crash which is the distance a free body in the vehicle would be displaced relative to the passenger compartment of the vehicle.

Continuing now with reference to FIG. 2, FIG. 2 illustrates measurement points (indicated by letters S, F1, F2, BSF, etc.) resulting from plotting the logarithm of the capacitance as the vertical coordinate and Q as the horizontal coordinate for a number of occupant positions and other circumstances such as an vacant seat, child seat, etc. These measurement points fall into groups around which ovals 102, 104, 106, 108, 110 and 112 are drawn. Further, each oval contains only points that are characteristic of a certain occupant position or other occupant quality and, with the exception of ovals 108 and 110, these ovals are clearly distinguished from each other by their physical separation. The fact that, excepting the aforementioned exception of the backward facing baby seat oval 110, the ovals are physically separated from each other illustrates that different categories of seat occupant are clearly distinguishable. This illustrates that a measurement of capacitance and Q when a person is positioned on the seat (or when the seat is vacant) can be used to determine the position of a person on a seat or the absence of a person and often distinguishes between persons and things that are not human occupying a seat.

FIG. 2 shows, for example, seven different measurement points in the oval 102 each represented by the letter "S". Each of the seven points in the oval 102 is the result of making a measurement of capacitance and Q for an occupant seated in a "normally seated" position. For each measurement the position on the horizontal axis corresponding to the measured Q and the position on the vertical axis corresponding to the measured capacitance are located and a letter "S" is placed at the point on FIG. 2 having those horizontal and vertical coordinates. The group of measurement points are distributed in such a way that they fall within an oval-shaped enclosure line 102. All of the points in oval 102 result from measuring the capacitance and Q for a person seated in a normal position. Oval 106 encloses a group of points "F2" which are obtained from measurements with the seat occupant leaning two inches forward. It also encloses one measurement point F1 taken with the occupant leaning one inch forward and one measurement point F3 taken with the occupant leaning three inches forward. All of the points in oval 112 represent a group of measurement points "O" taken with an unoccupied seat. Accordingly, it can be said that all points in oval 102 are "characteristic of measurement points resulting from measurements with the seat occupied by a person in the normal position. Similarly, all points in the oval 112 are characteristic of measurement points resulting from measurements made when the seat is vacant.

Note that the possibility of confusion between oval 110 and oval 108 is easily resolved. The measurements of oval 110 resulted from testing a baby seat having metallic structural elements located where they affected the measured capacitance. Only one of several baby seats tested had a structure that was sensed by the occupant presence and position sensing system of the invention. One way to avoid any possibility of confusion between a forward facing baby seat and a person leaning forward is to use a different baby seat. If deployment is desired, which is unlikely, a baby seat or child seat could be designed to have a capacitance characteristic of a normally seated person. It is evident that the case of a normally seated person indicated by measurements within the oval 102 are very clearly distinguishable from the case of an unoccupied seat indicated by measurements within the oval 112. The cases of the occupant leaning one to three inches forward indicated by measurements within the oval 106 and cases of the occupant leaning six to 11 inches forward indicated by measurements within the oval 108 are very clearly distinguished from the cases of no occupant and cases of a normally seated occupant but are only marginally distinguished from each other. However, the distinction is clear and it is expected to become clearer with further development.

It is desirable to be able to distinguish a person in a seat from something that is not human. The measurements within oval 104 result from placing aluminum foil over the area where an occupant might sit. The different points were obtained by varying the size and position of the aluminum foil. Oval 104 of FIG. 2 is clearly distinguished by its physical separation from ovals 102 and 106 which are the nearest ovals resulting from measurements made with a person in the seat. The clear physical separation between oval 104 and ovals 102 and 106 shows that a person and aluminum foil are clearly distinguished.

It is desirable to be able to distinguish an occupied seat which would require an air bag to be deployed from a seat containing a baby seat where deploying an air bag might cause injury. Most baby seats are molded of plastic and keep the baby sufficiently far from the seat that the occupant presence and position sensing system 10 returns measurements indicating the seat is vacant. Therefore, for such baby seats a baby in a baby seat is easily distinguished from a person who is not in a baby seat. However, certain baby seats incorporate metal frames to which a capacitive sensor responds. For this reason a baby seat having a metal frame was tested both in the forward facing position and in the rearward facing position. In the rearward facing case the metal structure was not near the seat back and the required distinction is easily made. Please refer to the measurement point labeled BSR near oval 112 in FIG. 2 to see the response to the rear facing case. The measurement points for the forward facing case are surrounded by oval 110 in FIG. 2. The data in oval 110 indicate that the baby seat is distinguished from a person in positions where air bag deployment would be desirable but is not distinguishable from the cases where the person is leaning 6 to 11 inches forward and air bag deployment may or may not be desired. Clearer distinction is desirable. Fortunately, there are many ways to enhance the distinction. One effective and inexpensive method is to surround certain of the tubular parts of the frame with plastic tubing to increase the distance from the frame to electrodes 22 and 24 hidden under the fabric of the seat. As mentioned hereinabove, a baby or child seat without a metal frame or one having a frame that has less effect on the capacitance between electrodes 22 and 24 may substituted.

When ovals suitable for identifying the required categories of seat occupant are determined for a vehicle then parameters defining the ovals are permanently stored in the memory of either the microprocessor of the decision making center 46 of the vehicle occupant protection system or a microprocessor associated with capacitance and Q measuring circuit 32. What is preferably stored are the horizontal and vertical components of the major and minor axes of the ovals treated as vectors each divided by the square of the length of the vector as described in detail hereinafter in conjunction with the description of the operation of the invention. Storing components of vectors having inverted lengths reduces the number of computations required when interpreting a capacitance and Q measurement as will be explained hereinafter when describing the operation of the embodiment of the invention wherein capacitance and Q measuring circuit 32 includes a microprocessor.

The materials and methods referred to hereinabove are only suggestions and other materials and methods may be selected by those skilled in the appropriate arts.

The operation of the occupant presence and position sensing system of the invention will now be described with reference to FIGS. 1 and 2. In operation of the system, the capacitance and Q measuring circuit 32 repeatedly measures the capacitance and Q between electrodes 22 and 24 at a repetition rate such as 200 measurements per second. Two hundred measurements per second enables measurement of the movement of a person as a crash progresses.

The process of associating the result of a measurement of Q and capacitance could be done manually by "eyeballing" the point representing the Q and capacitance in FIG. 2. If it is within an oval then it is assigned to that oval. For instance, if the point lies within oval 102 then it is assigned to oval 102. Any measurement points that do not fall within an oval are assigned to the oval to which the measurement point appears to be closest. Of course, the process is preferably carried out by a computer as described hereinafter with reference to an embodiment of the invention wherein capacitance and Q measuring circuit 32 includes a microprocessor.

In a simplified embodiment of the invention only the capacitance is measured by measuring circuit 32 which transmits each capacitance measurement through conductor 38 to the decision making center 46 of the vehicle occupant protection system. The decision making center 46 then partially bases its decision to deploy or not deploy the air bags on the recently received measurement values. Referring to FIG. 2, it can be seen that capacitance alone is sufficient to estimate the distance of the back of a person to the back of the seat and for determining if a seat is vacant but is not adequate for distinguishing such as aluminum foil from a person and is inferior to the combination of the logarithm of capacitance combined with Q for ascertaining the distance from the back of a person to the seat back In another embodiment of the invention the capacitance and Q measuring circuit 32 transmits the capacitance and Q of each measurement directly through conductor 38 to the decision making center 46 of the vehicle occupant protection system. The decision making center 46 then partially bases its decision to deploy or not deploy the air bags on the recently received measurement values.

In yet another embodiment of the invention, capacitance and Q measuring circuit 32 includes a microprocessor which interprets the measurements and supplies interpreted results to the decision making center 46 of the vehicle occupant protection system. In this embodiment capacitance and Q measuring circuit 32 examines the capacitance and Q of each measurement to determine to which oval the measurement should be assigned and transmits information identifying that oval to the decision making center 46 of the occupant protection system. Preferably, a number identifying that oval is transmitted. For example, if the point is assigned to oval 102, the number 1 might be transmitted, if the point is assigned to oval 104 the number 2 might be transmitted, etc. The assigned oval is identified by a process, repeated for each oval, that is equivalent to transforming the coordinates of the graph to convert the oval to a circle of unit radius. The distance in the transformed coordinate system from the measurement point to the center of the circle representing the oval is computed. This is repeated for each oval. The oval for which the distance from the measurement point to the center of the corresponding circle is smallest is selected as the oval to which the measurement is assigned.

In the preferred process the coordinates are not actually transformed but the mathematical equivalent is accomplished which is fully described in the following: As mentioned hereinabove, for each oval, vectors $V_{Major}$ and $V_{Minor}$ are defined from the center of the oval to the ends of its major and minor axes respectively. Vector $V_{Major}$ is divided by the square of its length and vector $V_{Minor}$ is divided by the square of its length to obtain two vectors $V_{MajorBar}$ and $V_{MinorBar}$ having lengths that are the numerical inverses of the lengths of the original vectors. Vectors $V_{MajorBar}$ and $V_{MinorBar}$ are defined by their horizontal and vertical components $V_{MajorBarQ}$, $V_{MajorBarC}$ and $V_{MinorBarQ}$, $V_{MinorBarC}$ respectively. For each oval the resulting four numbers are stored at manufacturing time in the memory of the microprocessor of measuring circuit 32. When a measurement of capacitance and Q is made a vector $MP_{Oval}$ is defined for each oval which is a vector from the center of the oval to the measurement point on the Q-log Capacitance or Q-logC plane. The vector $MP_{Oval}$ is defined by its horizontal and vertical components $MP_{OvalQ}$ and $MP_{OvalC}$ respectively. The horizontal component $MP_{OvalQ}$ of $MP_{Oval}$ is the difference between the Q coordinate of the center of the oval in the Q-logc coordinate system and the measured Q. The vertical component $MP_{OvalC}$ of $MP_{Oval}$ is the difference between the logC coordinate of the center of the oval in the Q-logC coordinate system and the logarithm of the measured capacitance. The vector dot (scaler) product of $MP_{Oval}$ and each of the vectors $V_{MajorBar}$ and $V_{MinorBar}$ is computed. The vector dot products are computed according to the formulas:

$$MP_{Oval} * V_{MajorBar} = MP_{OvalC} * V_{MajorBarC} + MP_{OvalQ} * V_{MajorBarQ}$$

and $$MP_{Oval} * V_{MinorBar} = MP_{OvalC} * V_{MinorBarC} + MP_{OvalQ} * V_{MinorBarQ}$$

The square of the distance from the center of the oval to the measurement point in the transformed Q-logC coordinate system is computed according to the formula:

$$\text{Distance Squared} = (MP_{Oval} * V_{MajorBar})^2 + (MP_{Oval} * V_{MinorBar})^2$$

Each dot product is the scaled projection of the vector $MP_{Oval}$ on one of the axes of the oval. Distance Squared is less than 1 when the measurement point plotted in the Q-logC plane is inside an ellipse that is centered at the center of the oval and has major and minor axes equal to the major and minor axes respectively of the oval. Distance Squared is greater than one when the measurement point is outside the aforementioned ellipse. Therefore, Distance Squared is a measure of how well a measurement point matches the measurement points which defined the oval. Therefore, the process of assigning an oval to a measurement point consists of calculating Distance Squared for each oval and selecting the oval for which Distance Squared is least. The number of the oval for which Distance Squared is least is then transmitted to the decision making center 46 of the occupant protection system.

In a fourth embodiment of the invention, circuit 32 contains a read only memory containing an array having the desired oval identifying number for each possible pair of capacitance and Q coordinates. For example, if the capacitance and Q measuring circuit 32 were designed to measure the capacitance as one of thirty possible values and Q as one of thirty possible values, an array containing 900 values of oval identifying numbers with 30 rows for the thirty values of capacitance and 30 columns for the thirty values of Q would allow the microprocessor to use the measured capacitance and Q to select the appropriate number from the array. The oval identifying number selected from the array according to the capacitance and Q is transmitted to the decision making center 46 of the occupant protection system.

It may be desirable to accurately determine the position of one or more parts of the occupant relative to the interior of the vehicle at all times during a crash. This is possible in embodiments of the invention that include seat position sensor 42. To accomplish this the occupant presence and position sensor of the invention continuously informs the decision making center 46 of the vehicle occupant protection system of the distance from the back of the seat to the back of the person. Each time a measurement is received the microprocessor in the decision making center 46 of the vehicle occupant protection system computes the position of parts of the occupant such as the head and the chest based upon the distance from the back of the seat to the back of the person, the position of the seat provided by seat position sensor 42 and (assumed) average dimensions of the person. For example, if the distance from the back of the seat to the back of the person is zero (the normal condition) the torso would be assumed to be an average torso and the front of the torso would therefore be calculated to be about ten inches away from the back of the seat and parallel with the back of the seat and the head would be calculated to be above the torso. During a crash if the occupant is not belted the occupant will move as a free body and the parts of the occupant will move forward from their initial positions relative to the interior of the vehicle a distance equal to the second integral of the acceleration. Therefore, when it is known that the seat belt is not fastened and the seat occupant has moved beyond where the position can be measured by the occupant presence and position sensor of the invention the position of the occupant is estimated by adjusting forward the computed position of the occupant computed on the basis of the output of the occupant position sensor of the invention when the crash began. The amount the position is adjusted forward is the second integral of the deceleration measured by the accelerometer in the SDM. For example, if the second integral of the deceleration is twelve inches at a certain time, all parts of the person are calculated to be twelve inches forward at that time from the position calculated for the time the crash began from the measurement of the distance of the back of the person from the back of the seat and the position of the seat provided by seat position sensor and assuming a person of average dimensions.

If the occupant is belted the lower part of the occupant may be allowed limited movement by the lap belt but will not move as a free body and the head and shoulders may move forward by an amount allowed by the shoulder belt and the parts of the occupant will move forward from their initial positions relative to the interior of the vehicle a distance equal to the second integral of the acceleration but limited by the belts. Depending on the seat belts this amount may or may not put the occupant beyond the distance where the position sensing system of the invention can make useful measurements of the occupant position. If not, both estimated movement based on the measured deceleration and the measurement of the occupant presence and position sensing system of the invention may be useful in combination to ascertain the position of the occupant. If occupant movement limited by the seat belts places the occupant beyond the range of the occupant presence and position sensing system of the invention, knowing that the occupant is beyond the range and that the occupant is belted provides additional information that is likely to be useful for determining optimum deployment of an occupant protection system.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In a vehicle having occupant protection means responsive to a crash, the improvement comprising:

a vehicle seat having a seat back, a seat cushion and sensing means producing a signal categorizing the distance of the back of a seated occupant from the surface of the seat back into at least three categories, and including control means responsive to said signal for controlling said response.

2. The invention as defined by claim 1 wherein:

said sensing means comprises an electrode in said seat cushion and an electrode in said seat back and means for producing a first signal indicating the capacitance between said electrodes, and said signal categorizing the distance is said first signal.

3. The invention as defined by claim 1 wherein:

said sensing means comprises: an electrode in said seat cushion, an electrode in said seat back, and means for producing a first signal indicating the capacitance between said electrodes and a second signal indicating the Q of said capacitance between said electrodes, and including means responsive to said first signal and said second signal by producing said signal categorizing the distance.

4. The invention as defined by claim 3 wherein:

said first signal is substantially proportional to the logarithm of said capacitance.

5. The invention as defined by claim 3 wherein:

said first signal is a function of said capacitance such that measurement points plotted on an x-y plot having said first signal as one coordinate and said second signal as the other coordinate form groups, and each of said groups comprise data points characteristic of a seat occupant and the position of that occupant.

6. The invention as defined by claim 5 wherein:

said first and second signals are also functions of said capacitance and Q such that each of said groups approximate a straight line having a characteristic midpoint, length and orientation.

7. The invention as defined by claim 6 and including:

means for associating a measurement point on said x-y plot having said first signal as one coordinate and said second signal as the other coordinate with one of said groups, whereby the content of said vehicle seat is categorized.

8. The invention as defined by claim 7 wherein:

said means for associating a measurement point with one of said groups comprises:
  computing means for computing a first vector dot product of a first vector defined for each group at the time of manufacture and a vector from said characteristic midpoint for each said group to said measurement point,
  computing means for computing a second vector dot product of a second vector defined for each said group at the time of manufacture and said vector from said characteristic midpoint for each said group to said measurement point,
  computing means for squaring said first and second vector dot products and adding the squared dot products together to obtain a sum, and
  means for selecting the group for which said sum is smallest.

9. The invention as defined by claim 7 wherein:

said signal categorizing the distance also categorizes said seat as empty or containing a rear facing baby seat and said control means prevents airbag activation when said signal categorizing the distance indicates said seat is empty or contains a rear facing baby seat.

10. In an occupant protection system of a vehicle comprising an occupant restraint, an accelerometer responsive to axial deceleration of said vehicle, and a microprocessor processing information from said accelerometer and controlling the activation of said occupant restraint, the improvement comprising:

a vehicle seat having a seat back, a seat cushion and occupant position sensing means for producing an occupant position signal categorizing the distance of the back of an occupant of said seat from said seat back into at least three categories, said occupant position sensing means being connected with said microprocessor for transmitting said occupant position signal thereto, seat position sensing means for producing a seat position signal indicating the position of said seat relative to a reference position fixed with respect to said vehicle, said seat position sensing means being connected with said microprocessor for transmitting said seat position signal thereto, and wherein said microprocessor being responsive to said occupant position signal and said seat position signal when controlling said activation of said occupant restraint.

11. The invention as defmed by claim 10 and including, an electrode in said seat cushion, an electrode in said seat back and means for producing a first electrical signal indicating the capacitance between said electrodes and a second electrical signal indicating the Q of said capacitance, and wherein said occupant position sensing means derives said occupant position signal from said first signal and said second signal.

12. The invention as defined by claim 10 and including:

means for combining said distance and said position of said seat to compute the position of the torso of said occupant relative to said reference position, and wherein said means responsive to said information is responsive to said position of said torso.

13. The invention as defined by claim 10 and wherein:

said microprocessor including code for combining said distance of the back of said occupant from said seat back and said position of said seat to compute the position of said occupant relative to a reference frame fixed with respect to said vehicle, and including means responsive to said position of said occupant relative to said reference frame for ascertaining when said activation of said occupant restraint is warranted.

14. In a vehicle having occupant protection means responsive to a crash, the improvement comprising:

a vehicle seat having a seat back, a seat cushion, an electrode in the seat back, and an electrode in the seat cushion, capacitance sensing means for producing a first signal indicating the capacitance between said electrodes, and control means responsive to said first signal for controlling said response to a crash.

15. The invention as defined by claim 14 wherein:

said capacitance sensing means also comprises means for producing a second signal indicating the Q of said capacitance, and said control means being responsive to both said first signal and said second signal for controlling said response to said crash.

16. The invention as defined by claim 15 and including:

means responsive to said first signal and said second signal by producing a seat occupant category signal that indicates to which of a set of at least three categories the occupant of the seat belongs, and wherein said control means being responsive to said seat occupant category signal for controlling said response to said crash.

17. The invention as defined by claim 15 wherein:

said first and second signals are functions of said capacitance and Q respectively such that points on an x-y plot having said first signal as one coordinate and said second signal as the other coordinate form groups, and each of said groups comprising data points characteristic of a seat occupant and the position of that occupant.

18. The invention as defined by claim 17 wherein:

said first and second signals are finctions of said capacitance and Q respectively such that said groups approximate straight lines, each group being approximated by a straight line having a characteristic midpoint, length and orientation.

19. The invention as defined by claim 17 wherein:

said first signal is substantially proportional to the logarithm of said capacitance.

20. The invention as defined by claim 17 and including:

means for associating a measurement point on said x-y plot having said first signal as one coordinate and said second signal as the other coordinate with one of said groups, whereby the content of said vehicle seat is categorized.

21. The invention as defined by claim 20 wherein:

each of said groups has a characteristic point on said x-y plot and said means for associating a measurement point with one of said groups comprises:

computing means for computing for each of said groups a first vector dot product of a first vector defined for the group at the time of manufacture and a vector from said characteristic point of the group to said measurement point, computing means for computing for each of said groups a second vector dot product of a second vector defined for the group at the time of manufacture and said vector from said characteristic point of the group to said measurement point, and computing means for computing for each of said groups the squares of said first and second vector dot products and adding said squares together to obtain a sum for each group, and wherein said means for associating comprises means for selecting the group for which said sum is least.

22. The invention as defmed by claim 15 and including:

means for determining from said first signal and said second signal if said seat is empty or contains a rear facing baby seat for enabling said control means to not activate said airbag when said means for determining determines that said seat is empty or contains a rear facing baby seat.

* * * * *